Fig 3.

Sept. 22, 1970     R. L. WARE     3,529,379
PLANT GROWTH APPARATUS

Filed Aug. 8, 1968     12 Sheets-Sheet 4

INVENTOR
R. LOUIS WARE

ATTORNEYS

United States Patent Office
3,529,379
Patented Sept. 22, 1970

3,529,379
PLANT GROWTH APPARATUS
Richard Louis Ware, 2108 Middlefork Road,
Northfield, Ill. 60093
Filed Aug. 8, 1968, Ser. No. 751,207
Int. Cl. A01g 9/14
U.S. Cl. 47—17     22 Claims

ABSTRACT OF THE DISCLOSURE

A plant growth apparatus in which plants are transported in a generally vertical direction.

---

This invention relates to an apparatus for transporting plants, and, more particularly, relates to an apparatus for transporting plants in a generally vertical direction.

So called "vertical" or "tower" greenhouses, or plant propagation chambers in which viable plants are transported along a fixed path during their growing cycle by a conveyor system, are known, as exemplified by the structures disclosed in Cornell Pat. 2,244,677 and Ruthner Pats. 3,254,447 and 3,254,448. Generally, such structures comprise a greenhouse-type building having means for creating an artificial environment therein and within which is positioned a conveyor system for transporting the plants to be grown along an upward and downward path during their growing cycle.

Such structures containing conveyor systems provide an excellent means for transporting growing plants but they require substantial construction. The present invention is directed to improvements in vertical plant transporting apparatus to provide a highly simplified apparatus and to provide an apparatus capable of growing plants under conditions normally difficult to achieve.

It is one object of this invention to provide a vertical plant transporting apparatus that is compact and readily may be assembled with a minimum of on-site construction.

It is another object of this invention to provide a vertical plant transporting apparatus having a vertical bank of fluorescent tubes in which the plants are exposed to maximum illumination.

It is still another object of this invention to provide a vertical plant transporting apparatus having a vertical bank of fluorescent tubes in which the illumination available to the plants is substantially uniform.

It is a further object of this invention to provide a vertical plant transporting apparatus having a vertical bank of fluorescent tubes in which ballasts for the fluorescent tubes are arranged and connected to provide a significant saving in wiring.

It is a still further object of this invention to provide a vertical plant transporting apparatus having a vertical bank of fluorescent tubes in which temperature control is improved.

It is another object of this invention to provide a vertical plant transporting apparatus having a vertical bank of fluorescent tubes in which plants readily may be subjected to varying intensities of fluorescent light.

It is an additional object to provide a vertical plant transporting apparatus in which plants may be grown under effective "zero" gravity conditions.

It is yet another object of this invention to provide a vertical plant transporting apparatus having an improved tray hanger arm.

It is also an object of this invention ot provide a vertical plant transporting apparatus having a vertical bank of fluorescent tubes in combination with a building heating system.

Further objects and advantages of the invention will appear from the following description and the accompanying drawings.

FIG. 6 is a cross-section taken along line 6—6 of FIG. 5.

Referring to the drawings, and particularly to FIG. 1 through FIG. 6, opposing upright columns 1 and 101 desirably comprise the essential support element for the entire vertical plant transporting apparatus. The columns are anchored at their base to beams 2 and 102 which, in turn, are rigidly connected by cross beams 3 and 103. In one embodiment, the chamber floor 4 is supported on cross beams 3 and 103. Since cross beams 3 and 103 are maintained in spaced relationship from the floor, completed smaller-size units readily may be moved with a fork-lift truck or the like. Alternately the chamber may be mounted on castors.

Figure 5:
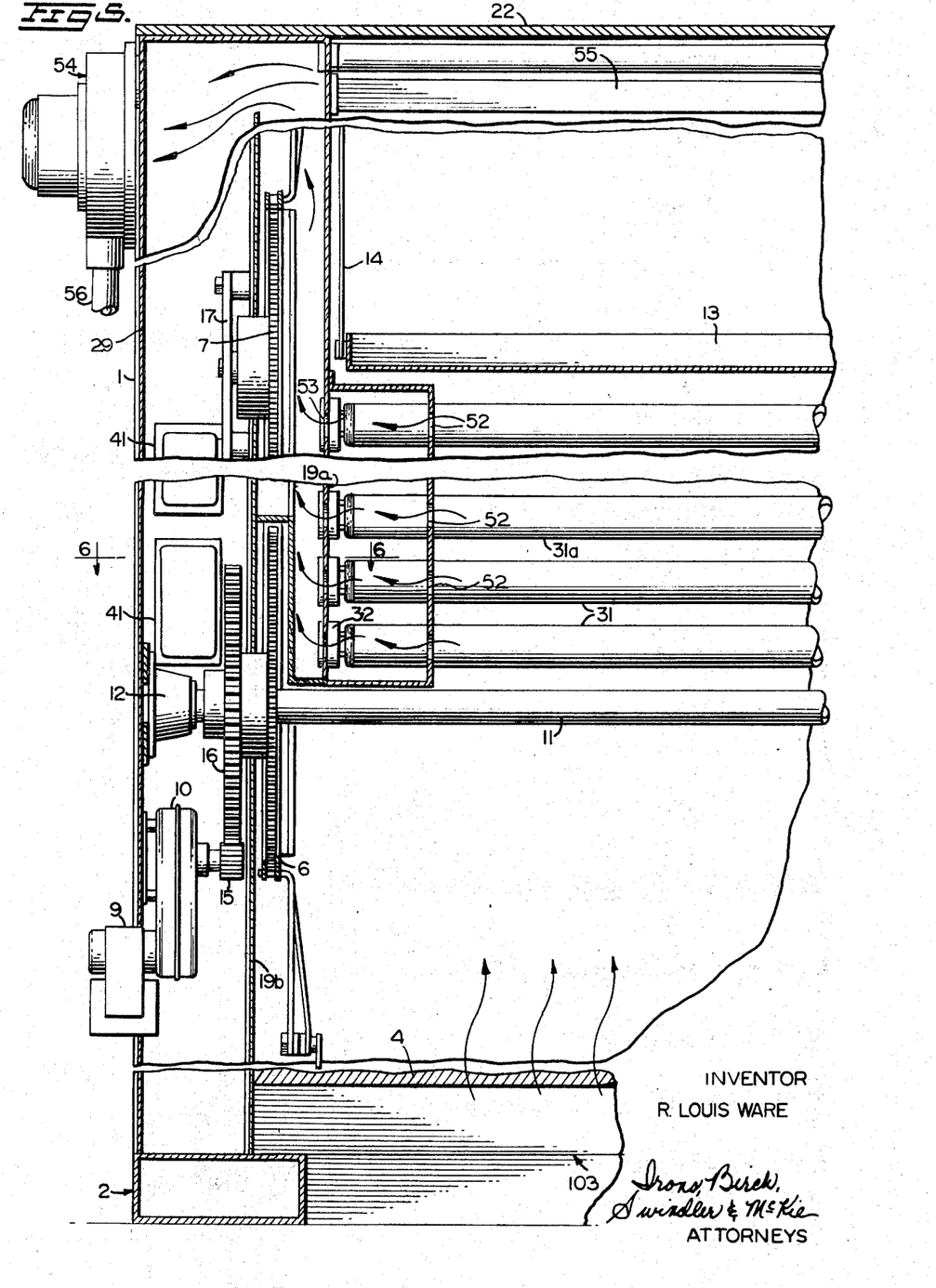
FIG. 5 is a cross-section taken along line 5—5 of FIG. 4.

Columns 1 and 101 support a conveyor means that, with reference to upright support 101 comprises conveying element 105 entrained about rotatable guide elements 106 and 107 and having attached thereto a plurality of carrying brackets 108. Column 1 similarly supports conveying means 5 entrained about rotatable guide elements 6 and 7 and having attached thereto a plurality of carrying brackets 8. The conveying elements of both upright supports 1 and 101 are driven in unison as shown in FIG. 5 by driving means 9 through variable speed drive 10, gears 15 and 16, and shaft 11 connected to rotatable guide elements 6 and 106. Shaft 11 conveniently may be supported, for example, by bearing 12 mounted on column 1 and by a similar assembly on opposing upright 101. Upper rotatable guide elements 7 and 107 need not be driven and need not be supported by a common shaft. For example, rotatable guide element 7 can be rotatably supported from the upper portion of upright column 1 as, for example, by a bearing mounted on plate 17. In a similar fashion rotatable element 107 can be rotatably supported from plate 117 of upright support member 101. The elimination of a shaft between rotatable guide elements 7 and 107 permits the tray in the upper position to extend below the center of the upper guide elements. If driving means 9 is mounted adjacent upper rotatable guide elements 7 and 107 and drives these elements, as by a common shaft, lower shaft 11 can be eliminated and rotatable guide elements 6 and 106 can be mounted from plates in a fashion analogous to that now shown for guides 7 and 107. In such event there is no obstruction above the trays during their entire cycle.

Figure 1:
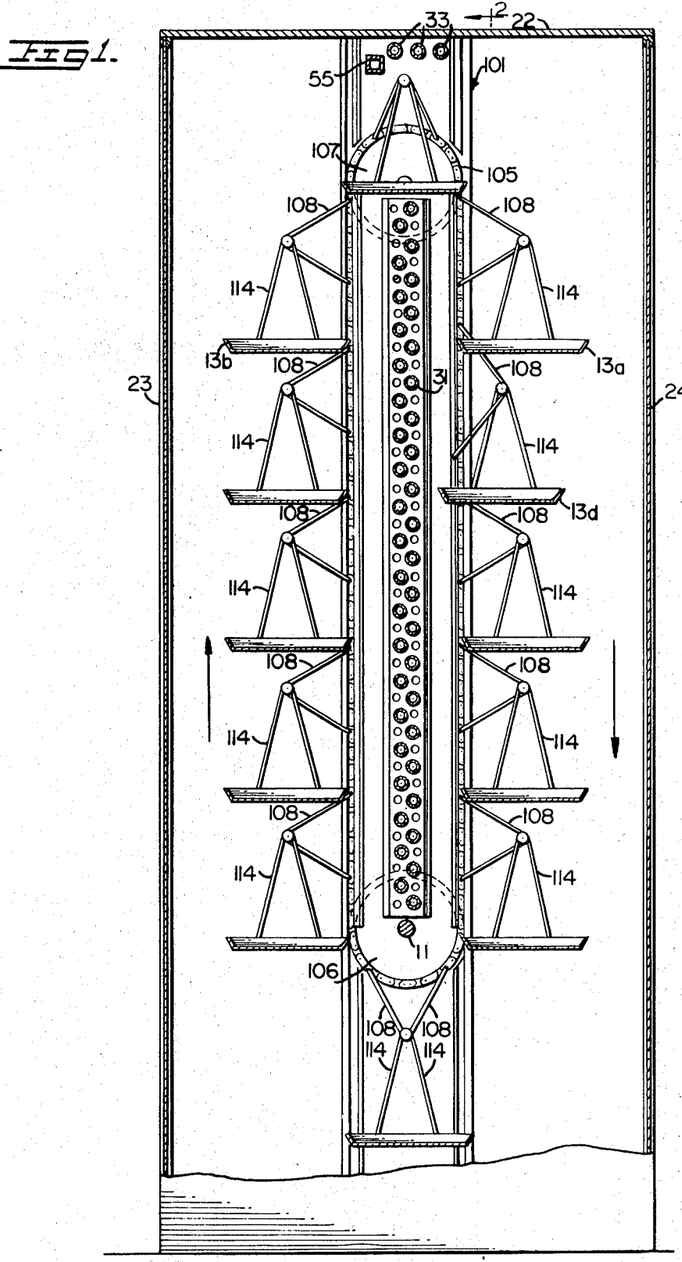
FIG. 1 is a side elevation partially broken away of a vertical plant transporting apparatus of the invention.
Figure 2:
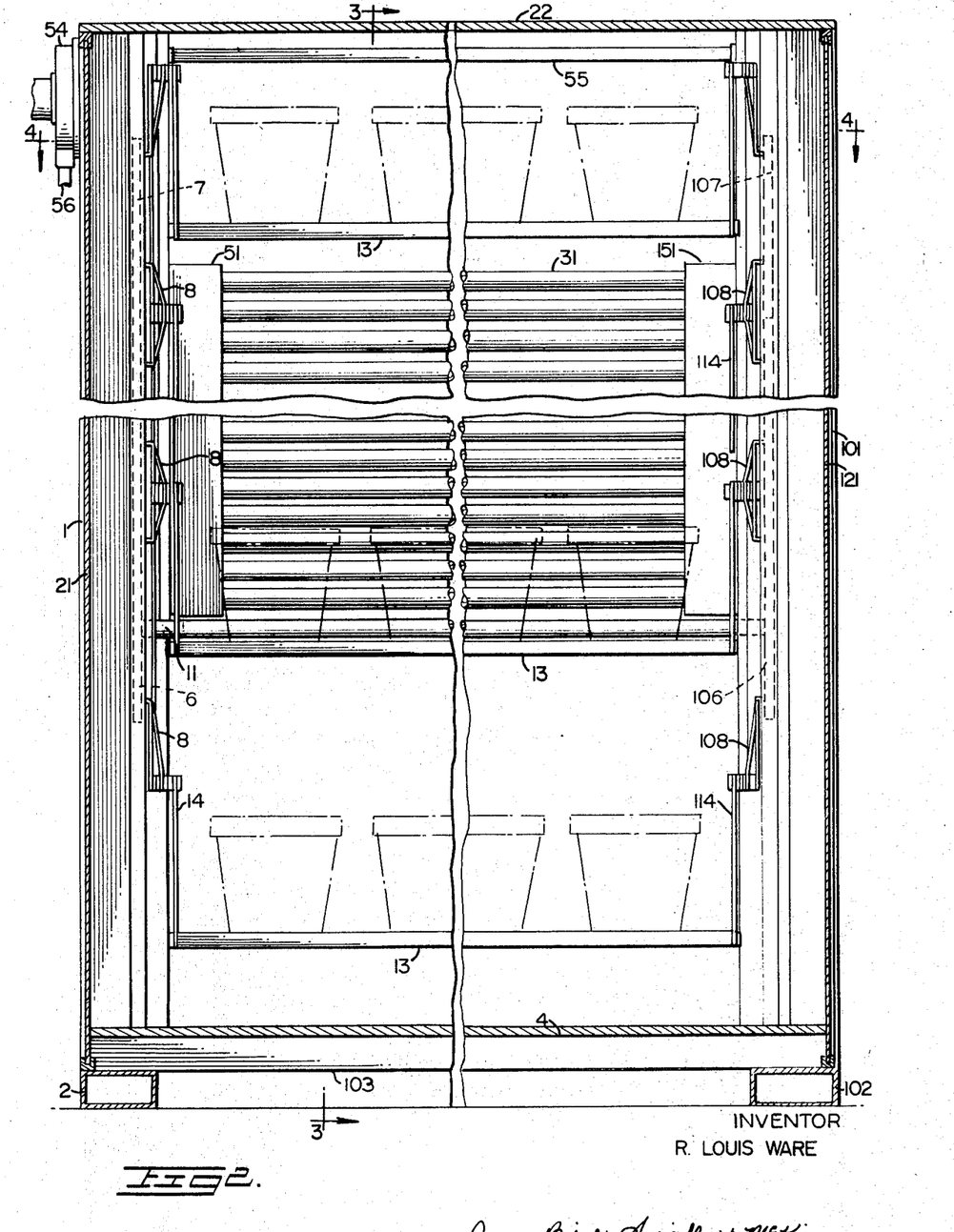
FIG. 2 is a front elevation cross-section of the vertical plant transporting apparatus taken along line 2—2 of FIG. 1.
Figure 3:
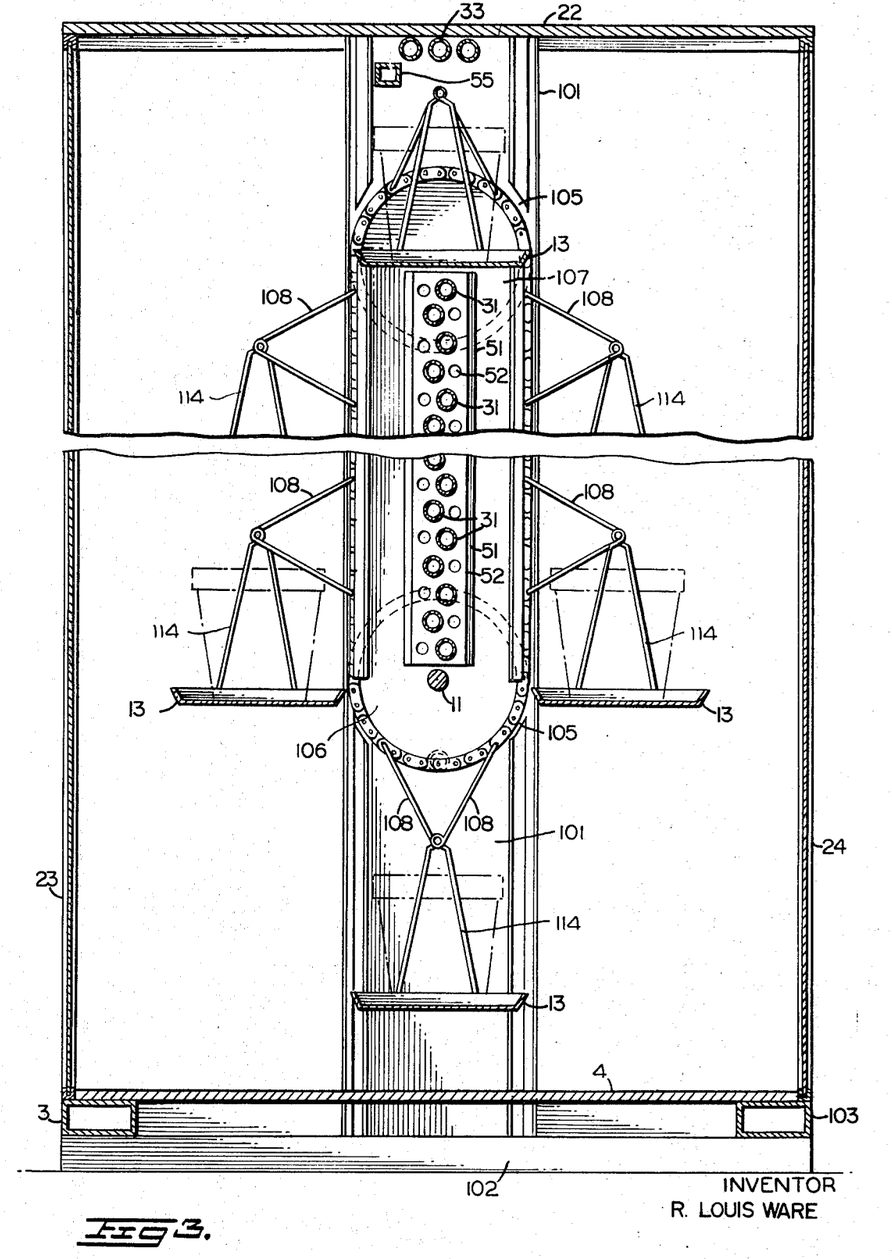
FIG. 3 is a side elevation cross-section taken along line 3—3 of FIG. 2.

Trays 13 extend between conveying elements 5 nad 105 and are pivotally connected to said conveying elements. As shown, tray arms 14 and 114 of trays 13 are pivotally connected to outwardly extending brackets 8 and 108. In normal operation as shown in FIG. 1 trays 13 descend on one side of the conveyor system as depicted by tray 13a, and ascend on the other side still maintaining the plants in an upright position as depicted by tray 13b.

As shown particularly in FIG. 6 upright support members 1 and 101 may be fabricated from a single structural extrusion. Thus members 1a and 1b are mirror images obtained from two lengths of the same extrusion member. Rigidity is obtained because of flanges 1c and cross support plates 18 positioned at intervals up the column. The members 1a and 1b can be employed to provide the essential structural strength and the inner surface member 19 and outer surface member 29 can be of lighter gauge material. If it is desirable to maintain the supports as completely enclosed members, an inner surface member 19b can be placed between flanges 1c at the upper and lower portions of the column. Therefore, with reference to FIG. 5 inner surface member 19b extends from the base of column 1 to above rotatable guide 6 at which point the inner surface 19b extends outwardly to join inner surface 19a. A similar arrangement of surfaces occurs at the top of the column. As will be developed more fully later, an enclosed hollow upright support can function as a support for the conveyor means, drives, fluorescent tubes, fluorescent tube ballasts and wiring, and outer enclosure members, and as an air exhaust conduit.

Figure 4:
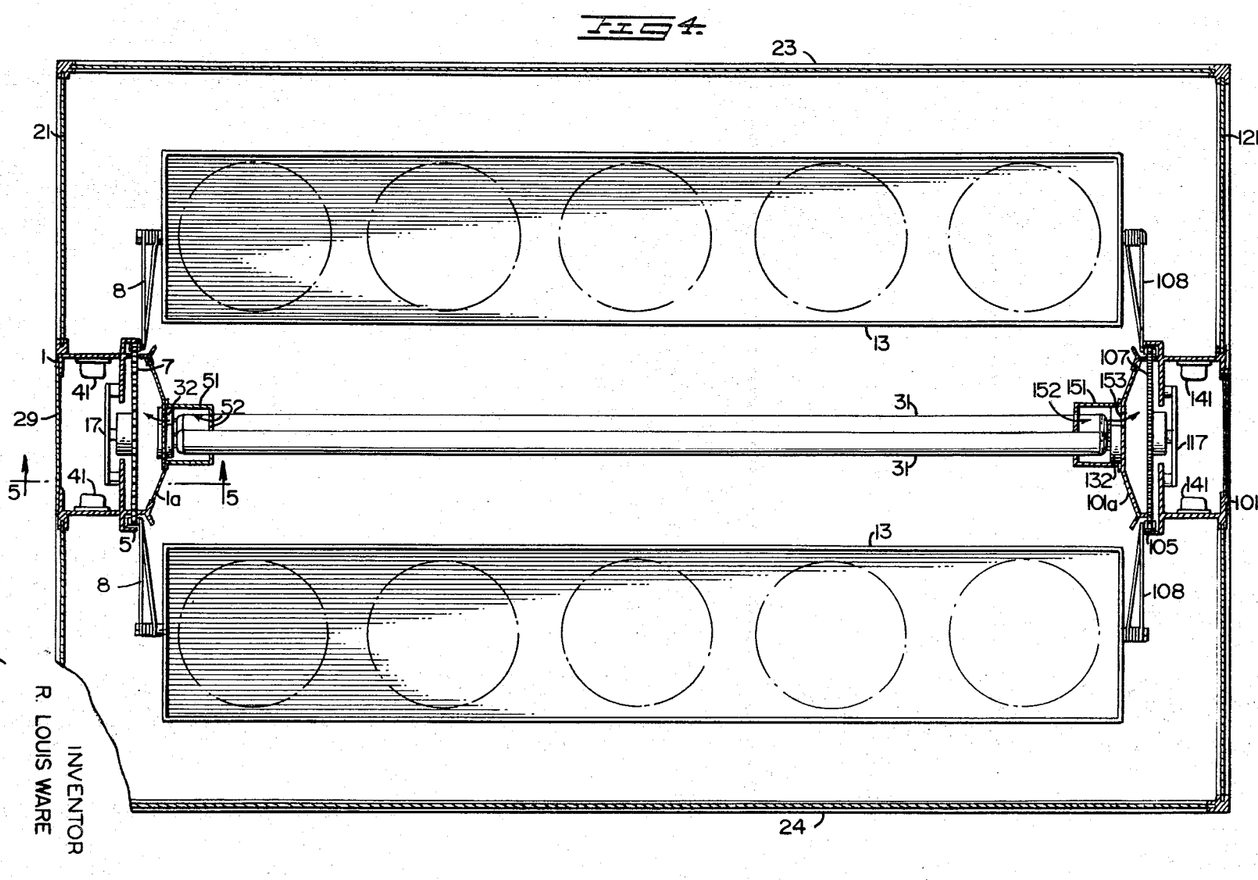
FIG. 4 is a plan cross-section taken along line 4—4 of FIG. 2.

Upright support members 1 and 101 also may support enclosure end members 21 and 121 and enclosure top member 22. As shown in FIG. 4 enclosure front and back members 23 and 24 in turn are connected to enclosure end members 21 and 121. Since enclosure top member 22 and floor member 4 are also supported by upright supports 1 and 101, a unitary structure integral with upright support members 1 and 101 is provided. At least one of the outer enclosure members desirably is transparent to admit light energy from the sun and/or to permit a viewer to observe the contents of the chamber.

Illuminating tubes 31 such as fluorescent tubes may also provide illumination for the plants and extend between sockets 32 and 132 on supports 1 and 101. In the preferred embodiment shown, the tubes are arranged in staggered relationship in order to provide the maximum amount of illumination. As the plants move through the 360 degree cycle both sides of the plant and both the top and bottom of leaf surfaces are equally exposed to the illumination. If desired an additional bank of illuminating tubes can provide overhead illumination to the trays as they traverse the upper guide elements 7 and 107. Conveniently such overhead illumination can be provided by illuminating tubes 33 positioned between upright supports 1 and 101. The choice of illumination tubes is within the skill of the art and, indeed, tubes are available commercially that provide intensified energy at wavelengths particularly desirable for plant growth.

It has been discovered that a significant saving in weight and in electrical wire can be achieved when fluorescent tubes are employed by proper location and wiring of ballasts 41 and 141. Ballasts 41 and 141 are supported by upright supports 1 and 101 and the first side of a ballast is connected to a nearby end of one fluorescent tube while the second side of such ballast is connected to the nearby end of another fluorescent tube. Thus a tube 31 is connected between the first side of a ballast 41 mounted in column 1 and the second side of a ballast 141 mounted in column 101. An adjacent fluorescent tube, on the other hand, is connected to the second side of a ballast 41 and to the first side of a ballast 141. Other fluorescent tubes in the vertical bank are connected in a similar manner. It will be apparent that either of the leads can be designated "the first side" so long as a consistent designation is employed with respect to all ballasts.

Figure 7:
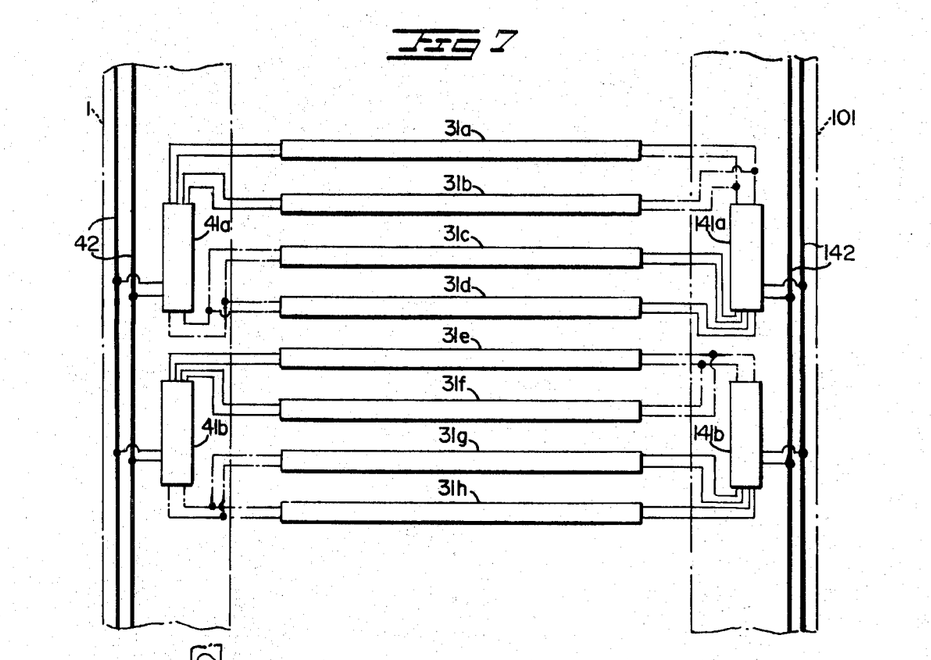
FIG. 7 is a schematic wiring diagram for fluorescent tubes 15.
Figure 18:
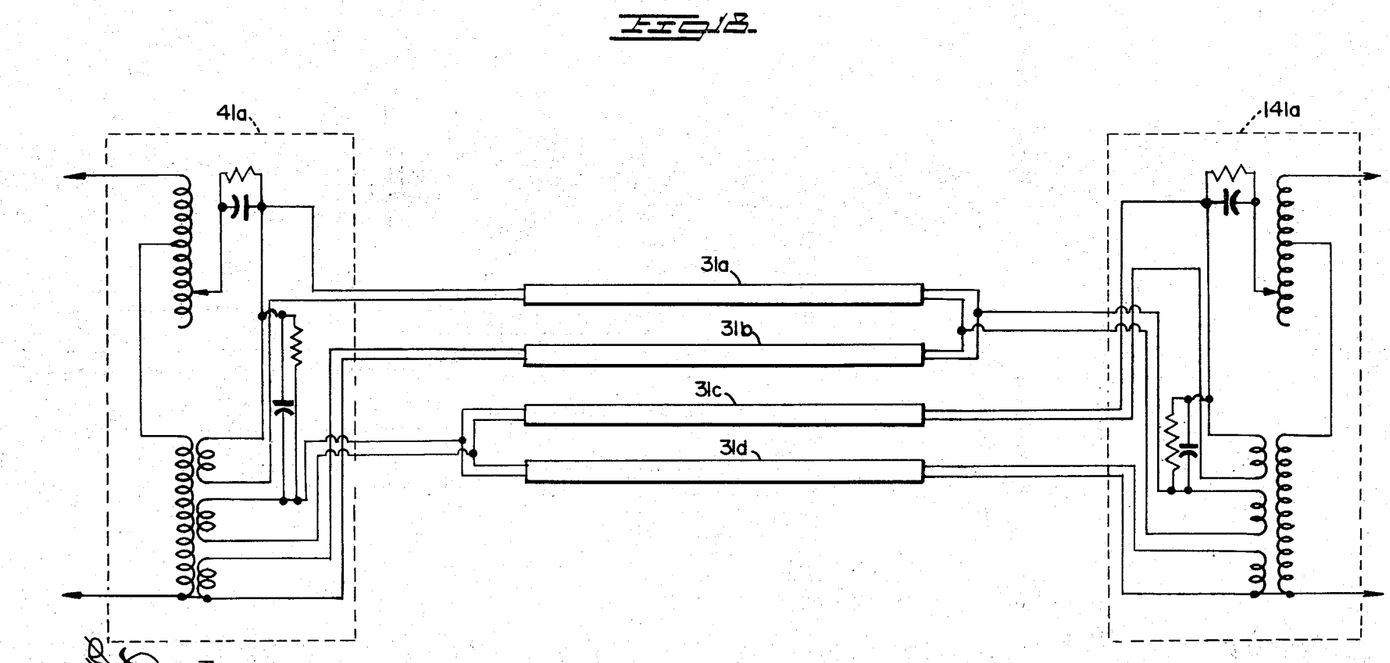
FIG. 18 is a schematic wiring diagram for the ballasts as shown in FIG. 7.

The above-described wiring of fluorescent tubes is schematically shown in FIGS. 7 and 18. In FIG. 7 ballasts 41a and 41b are mounted on upright support 1 while ballasts 141a and 141b are mounted on upright support 101. Power mains 42 extend along column 1 so that each ballast may be connected to the power mains adjacent its location. Similarly, power mains 142 extend along upright support 101 and provide power adjacent ballasts 141a and 141b. Each of power mains 42 and 142 appropriately may be provided with a receptacle connection at the base of the column. For purposes of illustration each of the ballasts is shown as a two-lamp ballast and in FIG. 7 the wiring from the first side of the ballasts to the tubes is shown as solid lines while the wiring from the second side of the ballasts to the tubes is shown as dotted lines. Lamps 31a and 31b are connected to the first side of ballast 41a at column 1 and the same lamps (31a and 31b) are connected to the second side of ballast 141a at column 101. Lamps 31c and 31d, on the other hand, are connected to the first side of ballast 141a and the second side of 41a. Tubes 31e and f and 31g and h are similarly connected between ballasts 41b and 141b. While FIGS. 7 and 18 depict two-tube ballasts, ballasts adapted for one or three tubes or more can be wired in a similar fashion. Moreover, it is not necessary that 41a and 141a be connected to the same tubes. Thus, for example, the second side of 41a could be connected to tubes 31g and 31h and the second side of 41b then would be connected to 31c and 31d. The remainder of the connections would remain unchanged. Ballasts for fluorescent tubes are well known to the art and are described, inter alia, in "Primer of Lamps and Lighting," Allphin, Sylvania Electric Products, Inc., 1965, pages 81 to 94.

The connection of the ballasts to different fluorescent tubes rather than to both ends of the same fluorescent tube as is normally done, effects a substantial saving in wire. For example, over 300 feet of wire can be saved in an 8 foot growth chamber with 32 fluorescent tubes. Moreover, the improved ballast wiring provides a substantially lighter structure and contributes meaningfully to the portability and ease of construction of the growth chamber. Since no cross-over wires are required the entire ballast wiring can be supported on the upright column with a single connection (e.g. receptacle or plug) provided to connect to an outside power source. The built-in power connection permits the wiring to be completed when the upright supports are manufactured and simplifies on-site construction. The installation of power mains extending up each column permits the power side of the ballasts to be connected to the power main adjacent the ballast and further contributes to a saving in wire.

It has been determined that a plant located near the end of tray 13 may receive about 20% less light tha a plant located near the central portion of tray 13. In order to provide a more uniform illumination support members 1 and 101 desirably are provided with reflecting inner surfaces 1a and 101a. The inner surfaces of support members 1 and 101, fo rexample, can be finished to a high polish or can be plated with chromium, aluminum or the like. Enclosure end panels 21 and 121 can also be provided with reflecting inner surfaces. In order to provide maximum utilization of the illumination from the fluorescent tubes, top, front and rear enclosure panels 22, 23 and 24 are also provided with reflecting inner surfaces. Desirably at least one of the panels is a one-way mirror to permit the ingress of sunlight and/or to permit an observer to see into the chamber. Such panel or panels can be conventional one-way glass mirrors or can be composed of transparent plastics having a thin coating of aluminum deposited on their inner surface. If all inner surfaces of the apparatus are reflecting surfaces, the apparatus approximates a light bank that constantly redirects light rays onto the plants on the trays.

Under some circumstances the use of a vertical bank of fluorescent tubes may tend to provide more heat than desired and create an uneven temperature profile in the growth chambeer. In order to overcome this possible increase in temperature selective ventilating means may be provided. Such means may comprise openings 53 and 153 located adjacent the tube ends. The plurality of openings 53 and 153 connect with hollow upright supports 1 and 101. Exhaust fan 54 is also connected to the hollow upright supports 1 and 101 by conduit 55 and exhausts through conduit 56. A check valve may be provided in exhaust conduit 56 to avoid an inadvertent intake of air.

In operation exhaust fan 54 draws air through openings 53 and 153 thereby effectively cooling the end of fluorescent tubes 31. A significant amount of the total heat given off by the fluorescent tubes is emitted from the cathode area, generally within about 4 inches of the end of the tube. If ballasts 41 and 141 are located in hollow upright support members 1 and 101 the exhaust system will also effectiveely dissipate the heat generated by the ballasts.

To localize the cooling even more members 51 and 151 having ventilating openings 52 and 152 may also be provided. Members 51 and 151 desirably are transparent (e.g. glass or transparent plastic) and have a vertical joint so that only one-half need be removed to replace a fluorescent tube.

Figure 8:
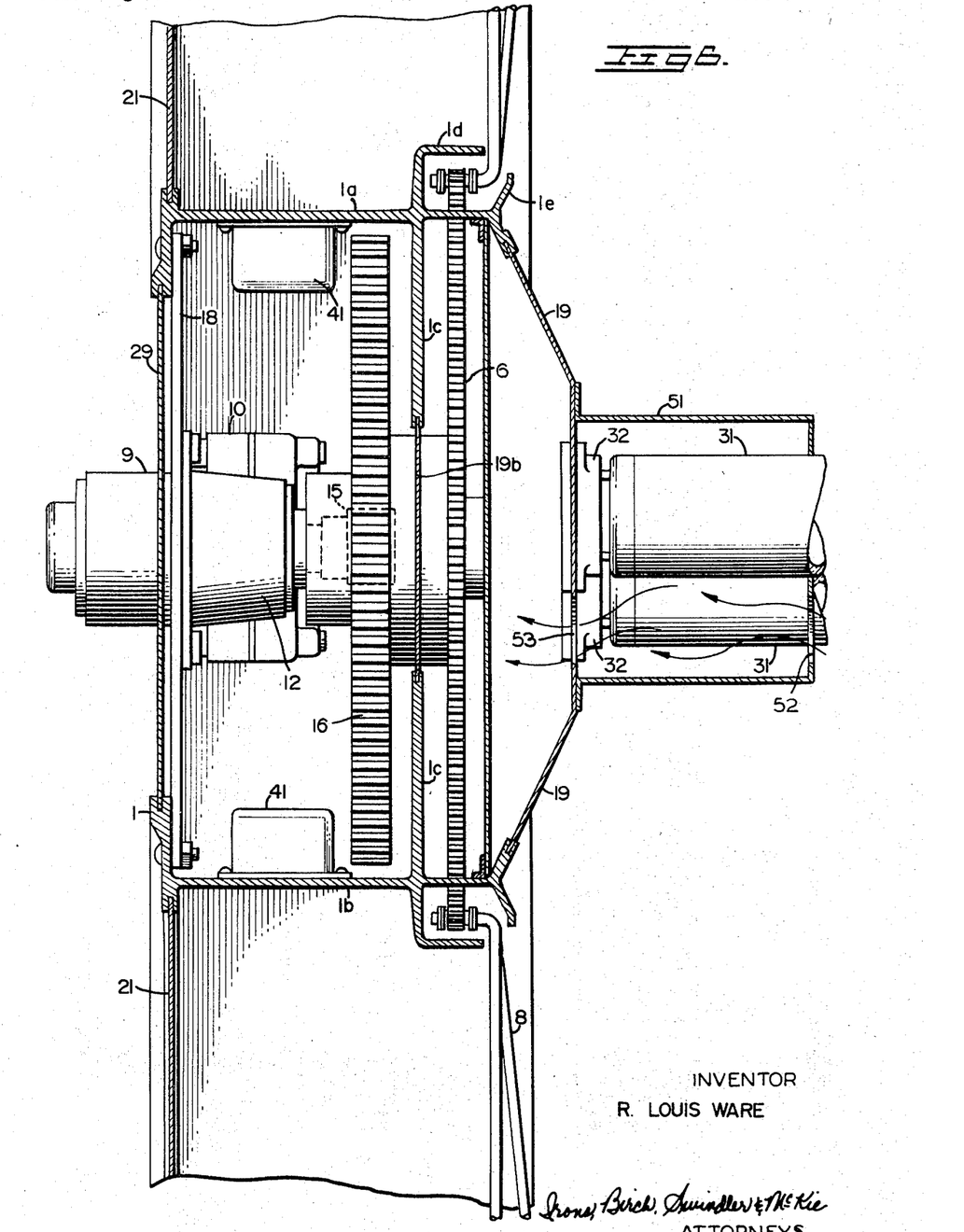
FIG. 8 is a detail of a carrying bracket.
Figure 9:
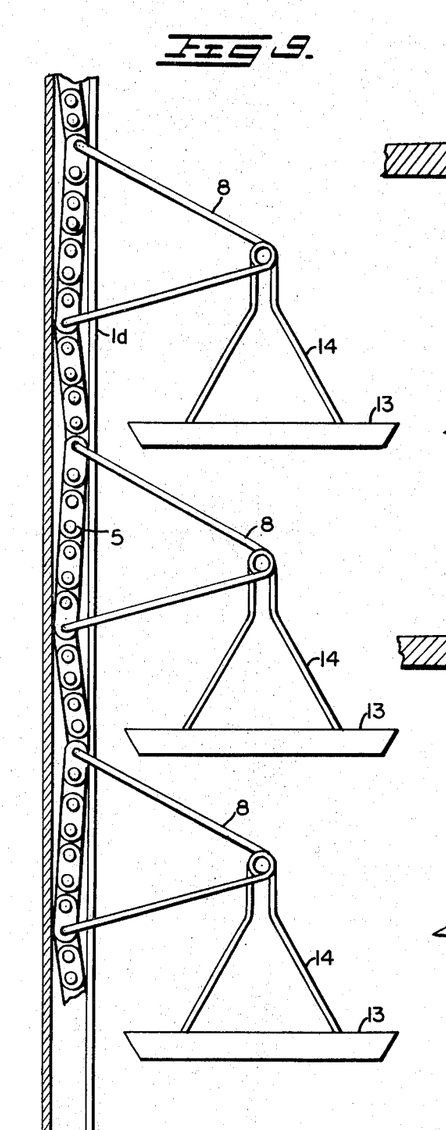
FIG. 9 is a partial view of a carrying bracket and trays assembled with a conveying element.

The lightweight tray carrying bracket 8 (or 108) shown in the drawings and especially in FIG. 8 constitutes another aspect of this invention. As shown, carry bracket 8 may be made of wire having, for example, a diameter of about 0.15 in. The carrying brackets have sufficient resilience to permit the ends connected to the conveying elements to move slightly with respect to each other as the conveying elements follow a curved path about the rotatable guide elements. The carrying brackets desirably are made from a single length of wire which is formed in several loops to define a socket for the tray pivot and which wire is turned 90° near the free end of each arm for connection to the conveying elements. In the event the conveying elements employ hollow pintles, each end of the carrying bracket readily may be snapped through a hollow pintle. A slight flare 8a at each extremity readily will function as a restraining means to maintain the bracket end within the hollow pintle or other socket of the conveying element. As shown in FIG. 9 tray arms 14 (or 114) may also be made of wire.

In addition to its light weight and ease of construction, the resilient carrying bracket of FIG. 8 has an added significant advantage. At the time of installation the bracket may be spread to any desired extent. Spreading the legs of the bracket will bring tray 13 closer to light source 31 as shown by tray 13d in FIG. 1. Conversely, bringing the ends of the carrying bracket closer together moves tray 13 further from the light source.

Figure 10:
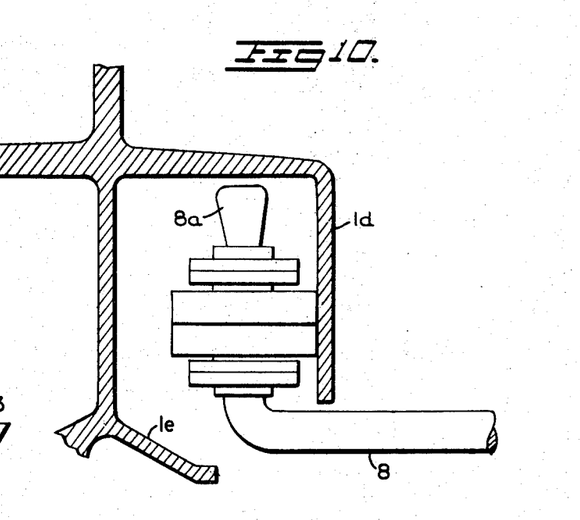
FIGS. 10 and 11 are details of the track for the conveying element.
Figure 11:
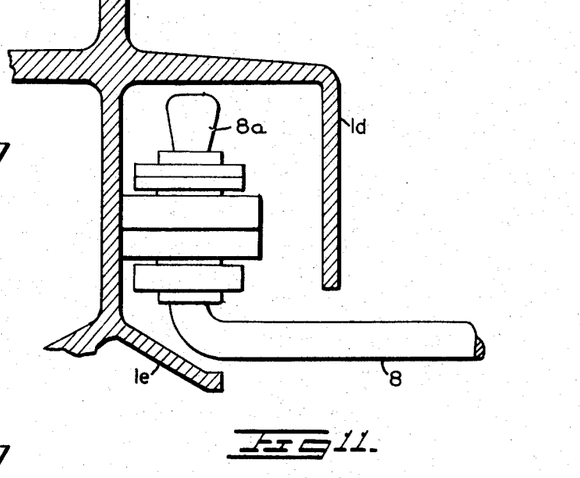

FIG. 9 depicts the carrying bracket of FIG. 8 assembled with trays 13 and conveying element 5. A portion of upright support 1, more specifically the track 1d for conveying element 5 is also shown. As indicated in the drawings, the carrying bracket of FIG. 8 is installed in the hollow pintles of conveying element 5. The weight of trays 13 will tend to pull the upper leg of the carrying bracket forward and will tend to push the lower leg of the conveying element back. The position of the upper leg with regard to the housing 1d is shown in FIG. 10, while the position of the lower leg with regard to housing 1d is shown in FIG. 11. The lip 1e of track 1d ensures that carrying bracket 8 will not become disconnected from the conveying element pintle during operation of the apparatus. Carrying bracket 8, however, readily may be removed from its socket when the apparatus is not in operation simply by pulling the bracket forward slightly so that both the upper and lower leg of the bracket assume the position shown in FIG. 10. In this position the bracket readily may be removed from its socket.

The use of a carrying bracket extending outwardly from the conveying element is an appropriate means to minimize the tendency of the plants to become entangled as the trays begin to pass over the rotatable guide elements. As the tray reaches the rotatable guide element its direction of movement begins to change from vertical to horizontal and its vertical velocity component diminishes. The use of a carrying bracket, however, results in an acceleration of the tray as it reaches the rotatable guide so that the velocity of the tray is greater as it passes around the guide element than the velocity along the vertical path of the conveying element. The relationship of the velocities is expressed by the formula:

$$V_2 = \frac{R_2}{R_1} \cdot V_1$$

wherein:

$V_1$=velocity along vertical path of conveying elements
$V_2$=velocity around guide element
$R_1$=radius of guide element
$R_2$=the radius to tray pivot connection.

The acceleration provided by the bracket minimizes the tendency of the plants to become entangled and, therefore, permits the use of a maximum number of trays in an apparatus. This feature is broadly described and claimed in copending application S.N. 687,305 filed Dec. 1, 1967.

Figure 12:
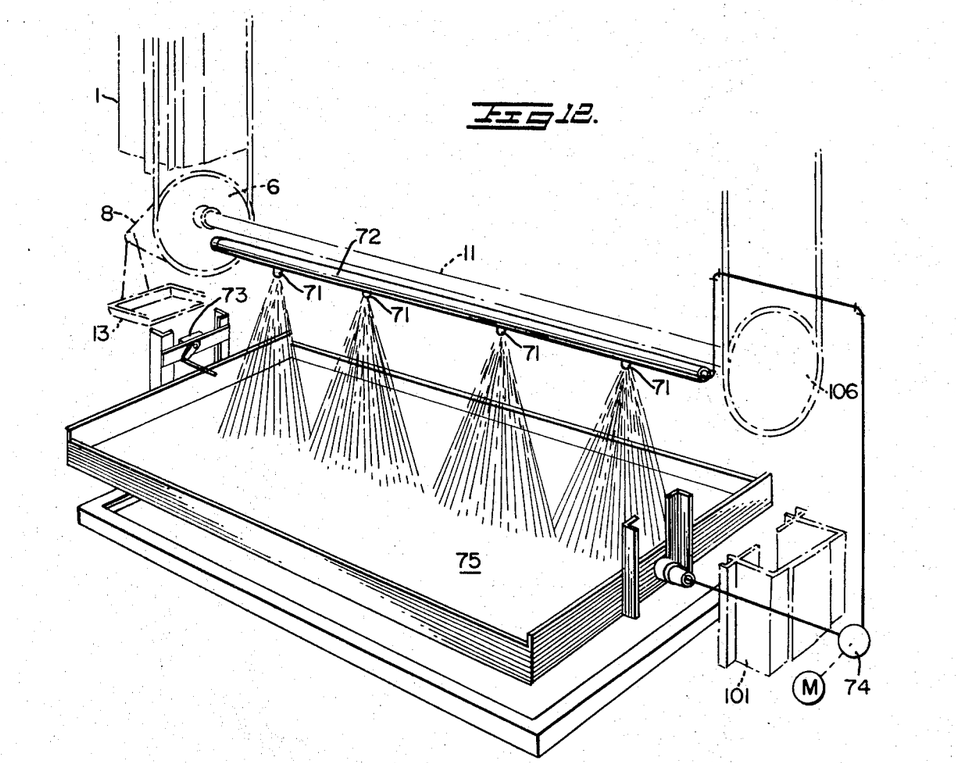
FIG. 12 is a detail of a plant irrigation system.

Selective irrigation of the trays is also contemplated by this invention. FIG. 12 is a partial view of the lower portion of the apparatus of this invention showing such means. Nozzles 71 are positioned on header 72 and are vertically directed to spray liquid on the trays as each tray passes through its lower-most position. Microswitch 73 actuates the motor of pump 74 which circulates fluid from reservoir 75 through the nozzles when the tray is in the lower-most position. As the tray moves away from the lower-most position and begins its ascending path, microswitch 73 turns off pump 74 so that liquid is sprayed only when a tray surface is below the nozzles. The liquid in reservoir 75 may be water or, if desired, may be water containing plant nutrients or the like. A timer may be employed in series with microswitch 73 so that the selective spraying will occur only during predetermined periods of time.

Figure 13:
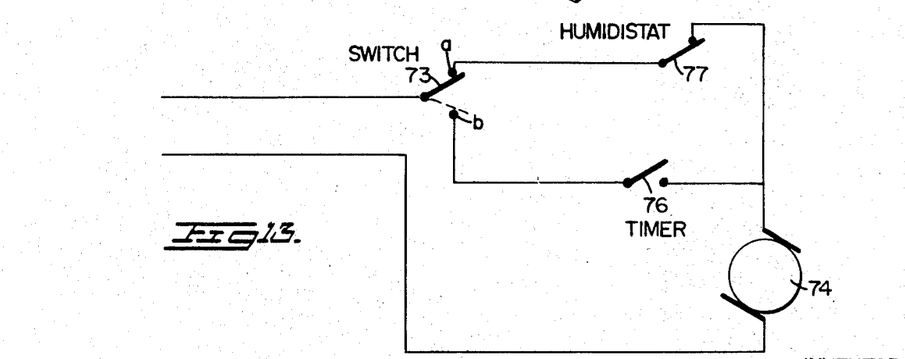
FIG. 13 is a wiring diagram for the plant irrigation system.

The system shown in FIG. 12 also may be employed to maintain humidity within the apparatus. In this embodiment a humidity sensor is added to the circuit. FIG. 13 shows a circuit diagram that depicts the multi-purpose circuit. Microswitch 73 is shown in its "open" position when no tray is directly beneath the nozzles. If the humidistat senses the need for moisture, switch 77 will close and the nozzles will spray liquid to add moisture to the air. As a tray approaches the spray path microswitch 73 will assume its "closed" position shown by a dotted line in FIG. 17. If the timer switch 76 is open no fluid will be sprayed while the tray is beneath the nozzles. As the tray passes from beneath the nozzles, however, microswitch 73 will again attain its "open" position and fluid will be sprayed to add additional moisture to the atmosphere. If the humidistat senses the need for additional water and the timer also closes for the addition of liquid to the plants, both switch 76 and 77 will be closed and the nozzles will spray continuously even though switch 73 will alternately assume its "open" and "closed" position. Switch 73 will complete the circuit in either its *a* or *b* position.

It should be noted that the above described structure permits pre-assembly of each upright support member containing the conveyor system, sockets for fluorescent tubes, fluorescent tube ballasts completely wired to the sockets and a single receptacle or plug at each column to connect to an outside power source. The drive means can be preassembled in conjunction with one upright support member and an exhaust fan, if used, can also be supported by an upright support member. On-site construction then may be accomplished merely by fixing two upright support members in place, installing fluorescent tubes, trays, shafts and outer enclosures and making a few additional minor connections if, for example, an exhaust system is used. The completed structure provides a simplified construction and maximum visibility.

Further adaptations are also contemplated by this invention.

In one embodiment of the invention the apparatus with growing plants is constructed in conjunction with a building and the air from conduit 56 is connected to the air circulating system for the building. When plants are grown in the growth chamber, the air drawn through conduit 56 will not only be warm because of heat from the lights but will also be moist and relatively rich in oxygen manufactured by the growing plants. Inasmuch as humans use oxygen and expel $CO_2$ while plants reverse the process and use $CO_2$ and expel oxygen, a portion of the air from the building may be circulated to the growth chamber. A growth chamber operated indoors can provide a substantial contribution to the heat requirements of a private residence while occupying a minimum of floor space. If desired the growth chamber can comprise a portion of one outside wall of a building so that the plants growing inside can make use of natural sunlight.

It has also been discovered that the apparatus of this invention can be adapted to regulate readily periods of varying illumination to which plants may be subjected. Varying illumination is recognized to be beneficial for plant growth and development. In order to accomplish this the apparatus may be provided with means for selectively energizing segments of the vertical bank of fluorescent tubes. For example, as shown schematically in FIG. 14 alternate segments of 5 tubes may be energized while intermediate segments of 5 tubes are de-energized. The movement of the plants adjacent to alternate segments of energized and de-energized tubes varies the intensity of the light on the plant.

Figure 14:
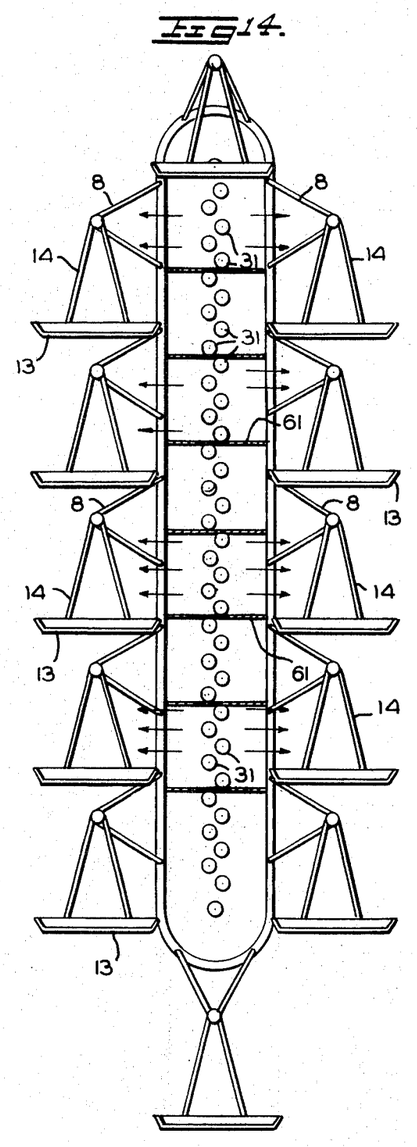
FIGS. 14 and 15 are schematic diagrams depicting embodiments in which plants are subjected to alternating illumination.

In order to provide even greater differentiation between light and dark zones the provision of shutter means 61 is contemplated. Such shutters separate the energized and de-energized segments and more closely define the areas of illumination by restricting the vertical scope of illumination.

Figure 15:
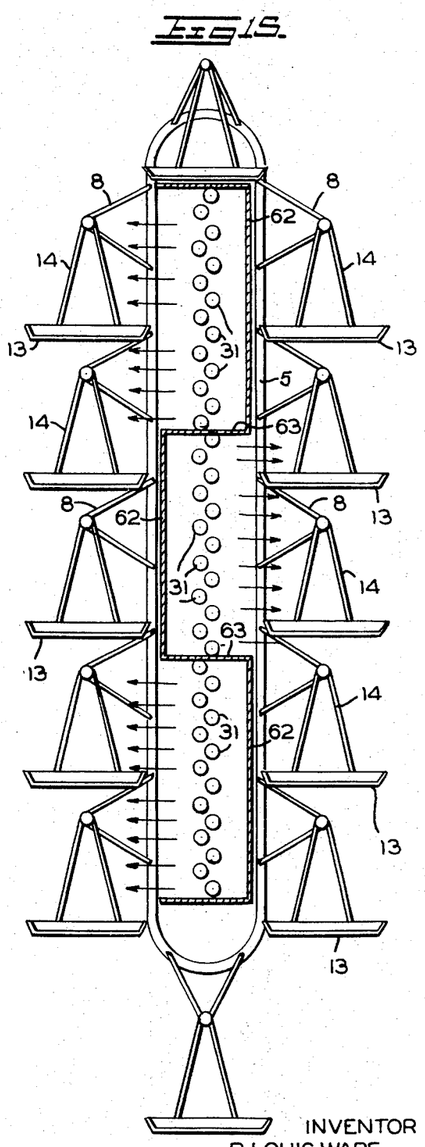

FIG. 15 schematically depicts an alternate method by which illumination may be varied. Reflectors 62 and shutters 63 cooperate to provide alternate areas of light and dark. It will be apparent that this embodiment permits the full use of all illuminating tubes in the apparatus even though the plants move through varying illumination.

In the above embodiments, frequency of light variation readily can be controlled merely by selecting the size of the segments and/or by controlling the speed at which the plants move. The apparatus, therefore, can provide pulsating or alternating illumination without the prohibitive wear and excessive power consumption that would result if illuminating tubes were constantly turned on and off. To obtain maximum benefit from variable illumination it is beneficial to employ very high energy illumination, and the apparatus of this invention is particularly well adapted for such illumination. The intensity of illumination striking the plant is, of course, a function both of the intensity of the light source and of the inverse of the square of the distance of the plant from the light source. The apparatus of this invention permits the entire vertical profile of the plant to be positioned close to the light source and movement of the plant past the light source reduces the danger of heat damage to the plant.

The use of a variety of different illuminating tubes that give off light of different wavelengths is also contemplated. For example, a top segment of tubes can give off light primarily in the shorter wavelengths while lower segments give off light in other wavelengths. In this embodiment the plants, as they move around the apparatus, pass through light of varying wavelengths. It is, of course, possible to combine this embodiment with the embodiments that create a varying intensity of illumination.

In still another aspect of this invention, it has been discovered that a vertical plant transport apparatus readily may be employed to grow plants under effective "zero" gravity which is recognized to be conducive to the transfer of phosphorus in plants and beneficial to plant growth, particularly during early stages of plant life. Increases in growth of up to 10% have been observed under "zero" gravity conditions. Such result may be achieved by providing tray fastening means selectively operable to maintain the position of the tray fixed with respect to the conveying means.

Figure 16:
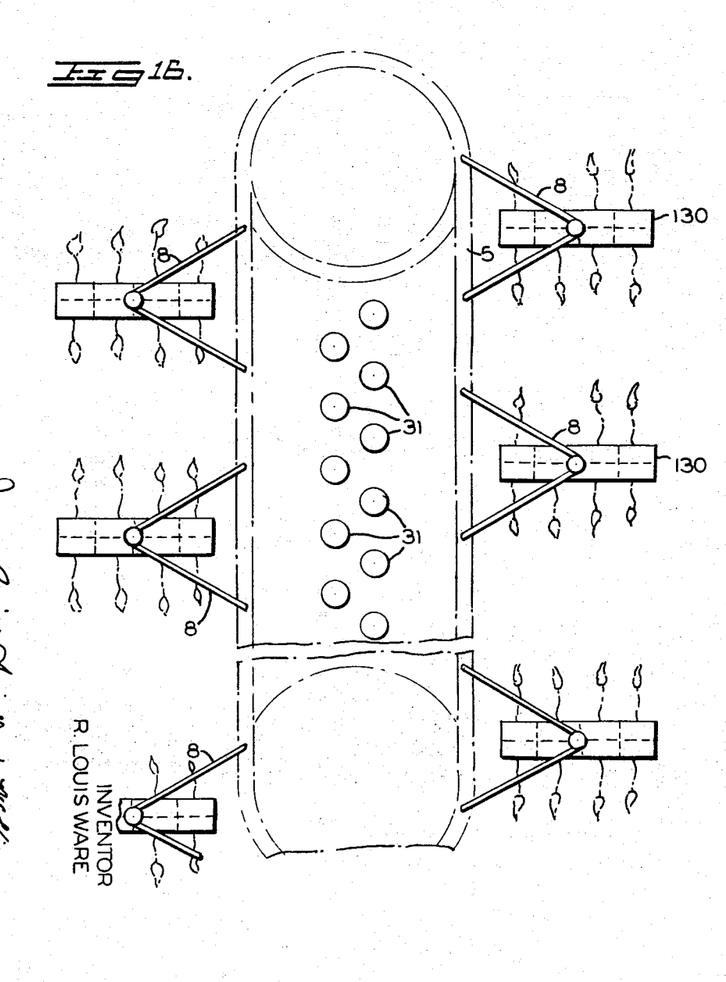
FIGS. 16 and 17 are schematic diagrams showing embodiments in which plants are subjected to "zero" gravity.

FIG. 16 schematically represents an embodiment in which the plants may be grown under "zero" gravity. In FIG. 16 trays 130 are connected to conveyor element 5 through brackets 8. As shown, plant containers are attached to both the top and bottom of the trays which are fixedly positioned with respect to brackets 8. Any given plant, therefore, grows against the force of gravity on one side of the apparatus and grows with the force of gravity on the other side of the apparatus to provide a net result of "zero" gravity. The plant containers are, of course, fastened to the trays and the plant soil is maintained within the container by means of a covering such as screen, cloth, or the like. Alternatively, a cast plastic soil can be fixed in the container or to the tray. It is apparent that plant containers may be attached to only one side of the tray if desired. This apparatus is ideally suited for growing young plants including fodder for animals.

Figure 17:
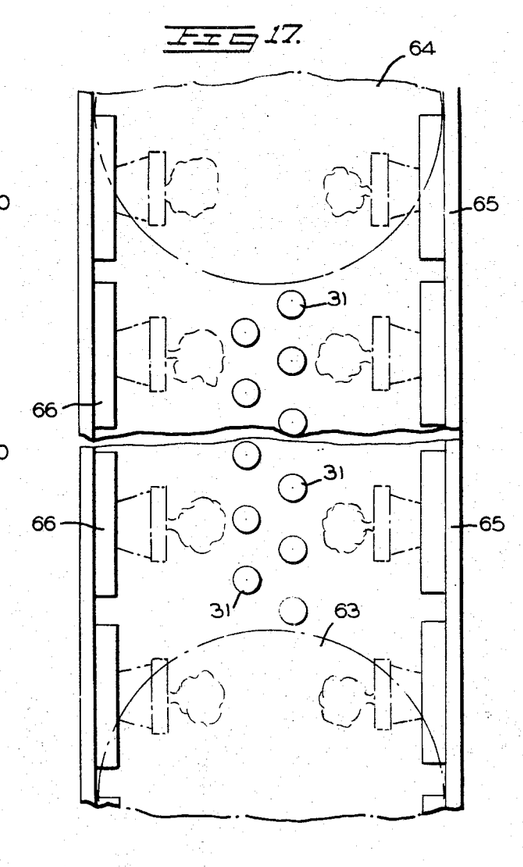

FIG. 17 schematically represents an alternate embodiment in which plants may be grown under "zero" gravity, while at the same time maintaining the plant oriented toward the light. Conveying means 65 is entrained about upper and lower rotatable guide elements 63 and 64. Trays 66 are fixedly positioned with respect to conveying means 65 with the trays facing fluorescent lights 31 on the vertical ascending and descending runs. As can be seen from FIG. 17, the plant always grows toward the light even though "zero" gravity conditions are simulated.

The above detailed description of this invention is not intended to exclude accessories which are commonly employed in conjunction with growth chambers, such as, for example, ventilating means, means for the addition of $CO_2$ or the like.

The apparatus of this invention can be employed to grow or maintain plants or to ripen fruit or vegetables and the term "plant" as used in the claims is intended to include picked fruit and harvested vegetables as well as growing plants. In addition to its utility as a vertical commercial greenhouse, it is a useful tool for research or for use in conjunction with biology programs at schools or the like. Moreover, the apparatus of this invention readily may be employed for merchandising purposes. Its vertical construction provides a maximum volume and maximum shelf space for the floor area occupied. In this regard the moving trays not only grow or maintain plants, fruit or vegetables but also provide an attractive and continuously changing display to attract the customer. The automatic nature of the apparatus eliminates the need for time-consuming attention by personnel.

The described preferred embodiments are not intended to limit the scope of the invention since modifications clearly are within the contemplation of this invention. For example, while it is preferred that the chamber rest on beams as shown in FIGS. 1–6, the chamber also may rest entirely on the floor or, indeed, the chamber may be hung from the ceiling. It is also contemplated that the plant transport means may be provided without the need for an outer enclosure. Similarly, while it is preferred that the plant carrying means include a bracket extending outwardly from the conveying elements, the trays may be pivotally attached directly to the conveying elements or other types of carrying brackets, hanger tray elements or the like may be employed. While a single upper and lower guide element is advantageous, more than one guide element can be employed and the drive elements can be located overhead if desired.

The invention is intended to be limited only by the scope of the appended claims.

I claim:

1. An apparatus for transporting plants comprising::
   a pair of horizontally opposed, upright support members;
   a conveying means supported by each of said members, each of said conveying means including a flexible conveying element and rotatable guide elements about which said conveying element is trained so that each of the conveying elements is adapted to move in a fixed endless path having a vertical ascending run and a vertical descending run;
   driving means connected to at least one rotatable guide element for each said conveying element for driving both of said conveying elements in unison;
   a plurality of carrying means each pivotally supported between said conveying elements;
   a vertically extending series of fluorescent tubes supported by and positioned between said upright support members; and
   ballasts supported by each of said upright support members the leads of each said ballast being connected to different fluorescent tubes at the tube end adjacent said ballast, whereby each fluorescent tube is connected between the first side of a ballast at one upright support member and the second side of another ballast at the other upright support member.

2. The apparatus of claim 1 wherein said upright support members are hollow and said ballasts are positioned within said hollow upright support members.

3. The apparatus of claim 2 wherein a power main extends up each said hollow column and each said ballast is connected to said power main.

4. The apparatus of claim 1 wherein each said carrying means includes a bracket attached to and extending outwardly from each said conveying element and trays pivotally connected to the outwardly extending portions of said brackets.

5. The apparatus of claim 1 having irrigation means mounted from said support members and selectively operable to spray liquid on plants during predetermined periods and only while the plant carrying means is positioned in the spray path.

6. The apparatus of claim 5 including a reservoir below said irrigation means to collect excess spray and recirculating means to recirculate the liquid from the reservoir to the irrigation means.

7. The apparatus of claim 5 further including control means activated by low humidity conditions to cause said irrigation means to spray liquid to the reservoir when no tray is positioned in the spray path.

8. The apparatus of claim 1 having an outer enclosure enclosing said conveying means, said plant carrying means and said illuminating tubes, at least part of the inner surface of said outer enclosure being a reflecting surface.

9. The apparatus of claim 7 wherein the entire inner surface of said outer enclosure is reflecting.

10. The apparatus of claim 8 wherein at least a part of said outer enclosure is a one-way mirror.

11. The apparatus of claim 1 wherein said upright support members have reflecting inner surfaces whereby light from the illuminating tubes is reflected by the upright supports onto said plant carrying means to provide more uniform illumination along said plant carrying means.

12. An apparatus for transporting plants comprising:
    a pair of horizontally opposed, upright support members;
    a conveying means supported by each of said members, each of said conveying means including a flexible conveying element and rotatable guide elements about which said conveying element is trained so that each of the conveying elements is adapted to move in a fixed endless path having a vertical ascending run and a vertical descending run;
    driving means connected to at least one rotatable guide element for each said conveying element for driving both of said conveying elements in unison;
    a plurality of carrying means each supported by both of said conveying elements each of said carrying means including at least one bracket attached to and extending outwardly from each of the conveying elements, said bracket comprising a continuous length of wire having a pair of legs with spaced inner ends connected to said conveying element and converging outer ends resiliently connected together to form a socket and to permit relative movement of said inner ends as said conveying element moves from said descending run to said ascending run;
    and each said carrying means further including a tray to carry plants, said tray being pivotally connected to said sockets.

13. The apparatus of claim 12 wherein said upright supports include tracks for said vertical ascending and descending runs of said flexible conveying elements, said tracks having a continuous back, outside end, and front.

14. The apparatus of claim 12 wherein upright supports include tracks for said vertical ascending and descending runs of said flexible conveying elements, said tracks having a continuous back, outside end, and front and further having a inside end member extending only partially from the back member to the front whereby the carrying brackets can disengage from the hollow sockets only when the flexible conveying element is positioned against the track front.

15. An apparatus for transporting plants comprising:
    a pair of horizontally opposed, upright support members;
    a conveying means supported by each of said members, each of said conveying means including a flexible conveying element and rotatable guide elements about which said conveying element is trained so that each of the conveying elements is adapted to move in a fixed endless path having a vertical ascending run and a vertical descending run;
    driving means connected to at least one rotatable guide element for each said conveying element for driving both of said conveying elements in unison;
    a plurality of carrying means pivotally supported between said conveying elements;
    a vertically extending series of fluorescent tubes supported by and positioned between said upright support members, the end portion of said tubes being enclosed in a transparent vertically extending housing, said housing having ventilating openigs.

16. An apparatus for transporting plants comprising:
    a pair of horizontally opposed, hollow upright support members;
    a conveying means supported by each of said members, each of said conveying means including a flexible conveying element and rotatable guide elements about which said conveying element is trained so that each of the conveying elements is adapted to move in a fixed endless path having a vertical ascending run and a vertical descending run;
    driving means connected to at least one rotatable guide element for each said conveying element for driving both of said conveying elements in unison;
    a plurality of carrying means pivotally supported between said conveying elements;
    a vertically extending series of fluorescent tubes supported by and positioned between said upright support members; and said upright support member having a plurality of openings adjacent the fluorescent tubes, said apparatus further having an exhaust fan in communication with said hollow upright support member whereby air passes adjacent the end of fluorescent tubes through the openings of the hollow upright support members.

17. The apparatus of claim 16 in which the air exhaust means is connected to the air circulating system of a building.

18. An apparatus for transporting plants comprising:
a pair of horizontally opposed, upright support members;
a conveying means supported by each of said members, each of said conveying means including a flexible conveying element and rotatable guide elements about which said conveying element is trained so that each of the conveying elements is adapted to move in a fixed endless path having a vertical ascending run and a vertical descending run;
driving means connected to at least one rotatable guide element for each said conveying element for driving both of said conveying elements in unison;
a plurality of carrying means each pivotally supported between said conveying elements;
a vertically extending series of illuminating tubes supported by and positioned between said upright support members; and
means for selectively energizing segments of said series of illuminating tubes whereby areas of varying illumination through which the plants move in each vertical ascending and descending run may be provided.

19. The apparatus of claim 18 further including shutters mounted on said supports between said segments to define areas of illumination.

20. An apparatus for transporting plants comprising:
a pair of horizontally opposed, upright support members;
a conveying means supported by each of said members, each of said conveying means including a flexible conveying element and rotatable guide elements about which said conveying element is trained so that each of the conveying elements is adapted to move in a fixed endless path having a vertical ascending run and a vertical descending run;
driving means connected to at least one rotatable guide element for each said conveying element for driving both of said conveying elements in unison;
a plurality of carrying means each pivotally supported between said conveying elements;
a vertically extending series of illuminating tubes positioned between said upright support members; and
a plurality of mirrors positioned between said illuminating tubes and said carrying members in an arrangement to provide varying illumination on the plants as they move past said illuminating tubes.

21. An apparatus for transporting plants comprising:
a pair of horizontally opposed, upright support members;
a conveying means supported by each of said members, each of said conveying means including a flexible conveying element and rotatable guide elements about which said conveying element is trained so that each of the conveying elements is adapted to move in a fixed endless path having a vertical ascending run and a vertical descending run;
driving means connected to at least one rotatable guide element for each said conveying element for driving both of said conveying elements in unison;
a vertically extending series of illumination tubes positioned between said upright support members; and
a plurality of carrying means each supported by both of said conveying elements and fixedly positioned relative to said conveying elements, whereby the upper portion of the carrying means during the ascending run becomes the lower portion during the descending run and plants carried by said carrying means are grown under zero gravity conditions.

22. An apparatus for transporting plants comprising:
a pair of horizontally opposed, hollow upright support members that provide the structural support for the apparatus;
a conveying means supported by each of said members, each of said conveying means including a flexible conveying element and rotatable guide elements about which said conveying element is trained so that each of the conveying elements is adapted to move in a fixed endless path having a vertical ascending run and a vertical descending run;
driving means mounted on one of said upright support members and connected to at least one rotatable guide element for each said conveying element for driving both of said conveying elements in unison;
a plurality of carrying means each pivotally supported between said conveying elements;
a vertically extending series of fluorescent tubes supported by and positioned between said upright support members;
an upper, side, front and back enclosure members supported by said hollow upright support members enclosing said conveying elements, said carrying means and said fluorescent tubes, at least one of said enclosure members being transparent to permit a viewer to observe the contents of the chamber;
ballasts positioned within said hollow upright support members; and
wiring for said apparatus positioned within said hollow upright support members.

References Cited

UNITED STATES PATENTS

| | | | |
|---|---|---|---|
| 1,412,593 | 4/1922 | Allsop et al. | 198—158 XR |
| 1,500,862 | 7/1924 | Bonaparte | 198—158 XR |
| 2,244,677 | 6/1941 | Cornell | 47—17 |
| 2,773,609 | 12/1956 | Holappa | 198—158 XR |
| 3,254,447 | 6/1966 | Ruthner | 47—1.2 |
| 3,276,163 | 10/1966 | Oepen et al. | 47—1.2 |
| 3,233,146 | 2/1966 | Vacha | 315—97 |
| 3,233,146 | 12/1966 | Vacha | 315—97 |
| 3,327,425 | 6/1967 | Dosedla et al. | 47—1.2 |

FOREIGN PATENTS

| | | |
|---|---|---|
| 163,369 | 6/1955 | Australia. |
| 45,506 | 5/1966 | Germany. |

ROBERT E. BAGWILL, Primary Examiner

U.S. Cl. X.R.

47—1.2; 198—158